US012698748B2

(12) United States Patent
Freer

(10) Patent No.: US 12,698,748 B2
(45) Date of Patent: Aug. 4, 2026

(54) CONTROL FOR ELECTRICALLY ASSISTED TURBINES

(71) Applicant: Pratt & Whitney Canada Corp., Longueuil (CA)

(72) Inventor: Richard Freer, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 96 days.

(21) Appl. No.: 17/402,483

(22) Filed: Aug. 13, 2021

(65) Prior Publication Data

US 2023/0047326 A1 Feb. 16, 2023

(51) Int. Cl.

| | |
|---|---|
| *F01D 15/10* | (2006.01) |
| *B64D 27/33* | (2024.01) |
| *B64D 31/18* | (2024.01) |
| *F02C 7/22* | (2006.01) |
| *F02C 9/28* | (2006.01) |
| *F02K 5/00* | (2006.01) |

(52) U.S. Cl.
CPC .............. *F02K 5/00* (2013.01); *B64D 27/33* (2024.01); *B64D 31/18* (2024.01); *F01D 15/10* (2013.01); *F02C 7/22* (2013.01); *F02C 9/28* (2013.01); *F05D 2220/323* (2013.01); *F05D 2220/76* (2013.01); *F05D 2270/052* (2013.01); *F05D 2270/3013* (2013.01); *F05D 2270/304* (2013.01)

(58) Field of Classification Search
None
See application file for complete search history.

(56) References Cited

U.S. PATENT DOCUMENTS

| | | | |
|---|---|---|---|
| 4,296,601 A | 10/1981 | Martin | |
| 4,644,744 A | 2/1987 | Mittendorf et al. | |
| 5,274,996 A | 1/1994 | Goff et al. | |
| 8,552,575 B2 | 10/2013 | Teets et al. | |
| 10,151,246 B2 | 12/2018 | Poumarede et al. | |
| 10,450,962 B2 | 10/2019 | Poumarede et al. | |
| 11,008,950 B2 | 5/2021 | Ethier et al. | |
| 2016/0305336 A1* | 10/2016 | Okada | F02C 9/18 |

(Continued)

FOREIGN PATENT DOCUMENTS

| | | |
|---|---|---|
| GB | 1258392 A | 12/1971 |
| WO | 2021/038604 A1 | 3/2021 |

OTHER PUBLICATIONS

European Patent Office, Communication re. extended European search report for European patent application No. 22190413.9, Jan. 3, 2023.

*Primary Examiner* — Phutthiwat Wongwian
*Assistant Examiner* — Jacek Lisowski
(74) *Attorney, Agent, or Firm* — Norton Rose Fulbright Canada LLP

(57) ABSTRACT

In accordance with at least one aspect of this disclosure, there is provided a method of accelerating a gas turbine engine. The method includes adding torque to a core of the gas turbine engine to accelerate rotation of the core by controlling fuel flow to a plurality of fuel injectors of the gas turbine engine. The method also includes adding torque to the core by powering an electric machine that is operatively connected to the core. In embodiments, controlling fuel flow to the plurality of fuel injectors is based on feedback from the electric machine.

7 Claims, 2 Drawing Sheets

(56)         References Cited

U.S. PATENT DOCUMENTS

| | | |
|---|---|---|
| 2018/0354631 A1 | 12/2018 | Adibhatla |
| 2019/0232950 A1 | 8/2019 | Atluri et al. |
| 2020/0025149 A1* | 1/2020 | Hrach ..................... F01D 11/14 |
| 2020/0062414 A1* | 2/2020 | Hon ...................... B60W 10/08 |
| 2020/0063599 A1* | 2/2020 | Waun ...................... B60L 1/003 |
| 2020/0392859 A1* | 12/2020 | Turner ...................... F02K 5/00 |
| 2021/0172384 A1 | 6/2021 | Brown et al. |

* cited by examiner

CONTROL FOR ELECTRICALLY ASSISTED TURBINES

TECHNICAL FIELD

The present disclosure relates to electrically-assisted acceleration of aircraft.

BACKGROUND

There is always a need in the art for improvements to electric propulsion in the aerospace industry.

SUMMARY

In accordance with at least one aspect of this disclosure, there is provided a method of accelerating a gas turbine engine. The method includes adding torque to a core of the gas turbine engine to accelerate rotation of the core by controlling fuel flow to a plurality of fuel injectors of the gas turbine engine. The method also includes adding torque to the core by powering an electric machine that is operatively connected to the core to drive the core. In embodiments, controlling fuel flow to the plurality of fuel injectors is based on feedback from the electric machine.

In certain embodiments, controlling fuel flow based on feedback from the electric machine includes controlling fuel flow to achieve a target torque from the electric machine. In certain embodiments, controlling fuel flow to the plurality of fuel injectors includes maintaining engine core acceleration below a predetermined limit for compressor acceleration for a compressor section of the gas turbine engine.

In certain embodiments, controlling fuel flow to the plurality of fuel injectors includes maintaining an acceleration of the core below a predetermined limit for P3/P1 ratio, where P3 is compressor discharge pressure for the gas turbine engine and P1 is ambient pressure for the gas turbine engine. In certain embodiments, powering the electric machine includes controlling the electric machine based on a core speed feedback from the core to reach a target core speed.

In accordance with another aspect of this disclosure, there is provided a method of accelerating a gas turbine engine. The method includes adding torque to a core of the gas turbine engine to accelerate rotation of the core by controlling fuel flow to a plurality of fuel injectors of the gas turbine engine. In embodiments, the method also includes, adding torque to the core by powering an electric machine that is operatively connected to the core. In certain embodiments, powering the electric machine includes controlling the electric machine based on a core speed feedback from the core to reach a target core speed.

In certain embodiments, controlling fuel flow includes controlling fuel flow based on feedback from the electric machine and controlling fuel flow to achieve a target torque from the electric machine. Additionally or alternatively, controlling fuel flow includes maintaining an engine core acceleration below a predetermined limit for a compressor section of a the gas turbine engine. Additionally or alternatively, controlling fuel flow includes maintaining the engine core acceleration below a predetermined limit for P3/P1 ratio, where P3 is compressor discharge pressure for the gas turbine engine and P1 is ambient pressure for the gas turbine engine, and where P3 is compressor discharge pressure for the gas turbine engine and P1 is ambient pressure for the gas turbine engine.

In accordance with yet another aspect of this disclosure, there is provided an electrical assist system for an aircraft gas turbine engine. The system includes a gas turbine engine having a compressor section with an inlet and an outlet, a combustor with an inlet and an outlet, the inlet of the combustor in fluid communication with the outlet of the compressor section, and a turbine section with an inlet and an outlet, the inlet of the turbine section in fluid communication with the outlet of the combustor.

An engine core extends through and operatively connects the compressor section and the turbine section, and a plurality of fuel injectors fluidly are connected to issue fuel into the combustor for combustion. In embodiments, an electric machine is operatively connected to the engine core.

A control module is operatively connected to control fuel flow to the plurality of fuel injectors and to control the electric machine based on feedback from at least one of: the compressor section, the engine core, the turbine section, and/or the combustor. In certain embodiments, the control module includes machine readable instructions operative to perform acceleration of the engine core.

In embodiments, the machine readable instructions are operative to add torque to the engine core to accelerate rotation of the engine core by controlling fuel flow to the plurality of fuel injectors of the gas turbine engine, and to add torque to the engine core by powering the electric machine, where controlling fuel flow is based on feedback from the electric machine.

In certain embodiments, controlling fuel flow based on feedback from the electric machine includes controlling fuel flow to achieve a target torque from the electric machine. In certain embodiments, controlling fuel flow to the plurality of fuel injectors includes maintaining an engine core acceleration below a predetermined limit for compressor acceleration for the compressor section. In certain embodiments, controlling fuel flow to the plurality of fuel injectors includes maintaining an acceleration of the engine core below a predetermined limit for a P3/P1 ratio, where P3 is compressor discharge pressure for the gas turbine engine and P1 is ambient pressure for the gas turbine engine.

In embodiments, the engine core further includes a high pressure core operatively connecting a high pressure turbine of the turbine section to drive a high pressure compressor of the compressor section. A low pressure core connects a low pressure turbine of the turbine section to drive a low pressure compressor of the compressor section. In certain such embodiments, the electric machine can be operatively connected to at least one of the high pressure core and/or the low pressure core. In certain embodiments, the electric machine includes a plurality of electric machines and the plurality of electric machines can be operatively connected to both the high pressure core and the low pressure core.

In embodiments, a feedback control loop is used to control fuel flow to the plurality of fuel injectors based on torque feedback and rotational speed feedback from the electric machine. In certain embodiments, the feedback control loop includes a power sensor electrically connected to the electric machine to sense voltage and current of power supplied to the electric machine so that the control module is operable to control fuel flow based on feedback from the power sensor.

In certain embodiments, the feedback control loop includes a speed sensor operatively connected to a rotatable component of the electric machine to sense rotation speed of the electric machine so that the control module is operable to control fuel flow based on feedback from the speed sensor. In certain embodiments, the feedback control loop includes, at least one of: a rotational speed sensor operatively connected to the engine core, an ambient pressure sensor, and/or a compressor discharge pressure sensor so that the control module is operable to control fuel flow based on feedback from the at least one of the rotational speed sensor, the ambient pressure sensor, and/or the compressor discharge pressure sensor.

In embodiments, a fuel pump connects a fuel source in fluid communication with the plurality of fuel injectors, and the control module is operatively connected to control the fuel pump to control fuel flow to the plurality of fuel injectors. In certain embodiments, controlling fuel flow includes adding fuel flow until the electric machine reaches a torque target.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
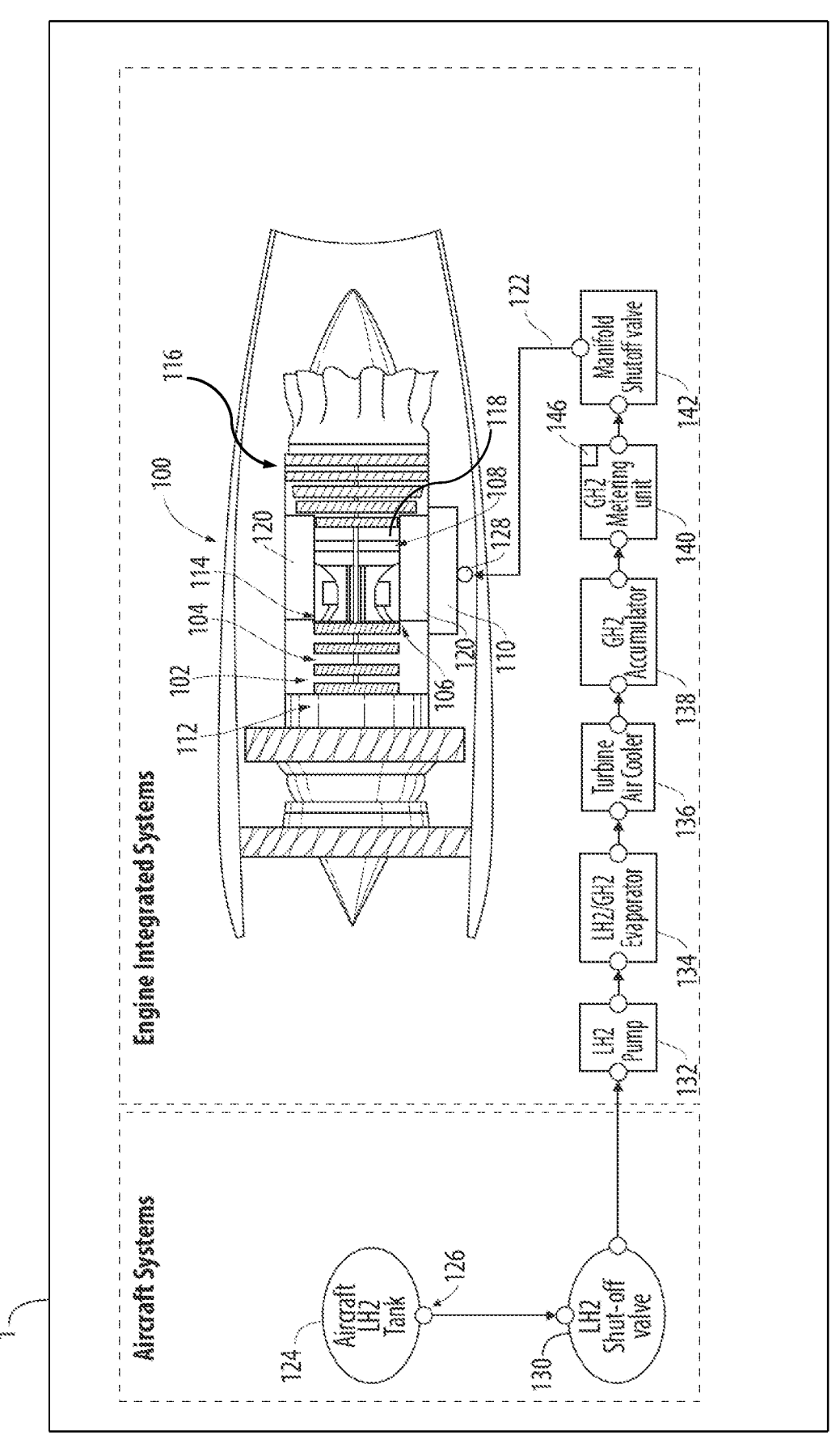
FIG. 1 is schematic cross-sectional side elevation view an aircraft engine in accordance with this disclosure, showing a plurality of fuel components connecting a fuel source to a combustor.
Figure 2:
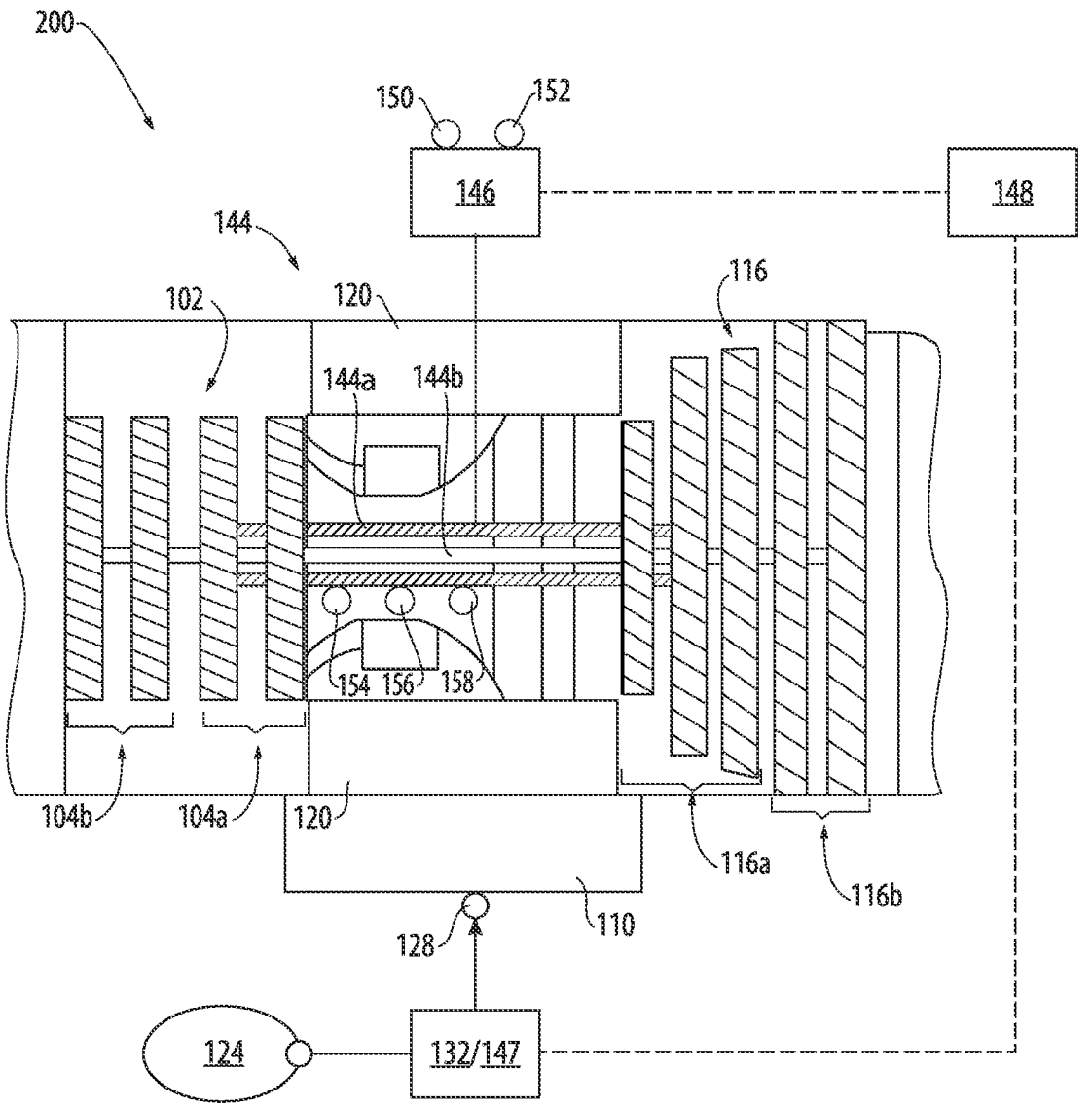
FIG. 2 is an schematic view of the engine of FIG. 1, showing an electric assist system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to provide electric assist for turbine engines.

This disclosure relates generally to gas turbine engines, and more particularly to gas turbine engines with electrical motor assistance. In general, there is a limit to how fast a gas turbine engine core can accelerate by just increasing fuel flow to the fuel injectors. This limit can be increased by adding power to the engine core from an electrical motor. In order to control correctly control the electric motor assist, certain control algorithms are required. However, there is a need in the art for more reliable and robust control methods for electrically-assisted acceleration in the aerospace industry. For example, previous systems did not consider adjusting fuel supplied to the engine based on a known condition of the electric motor. This disclosure provides a solution for this need for example, by including both an electric motor control loop and an engine core fuel flow control loop to achieve the target engine speed.

In certain embodiments, referring to FIG. 1, an aircraft 1 can include an engine 100, where the engine 100 can be a propulsive energy engine (e.g. creating thrust for the aircraft 1), or a non-propulsive energy engine, and a fuel system. As described herein, the engine 100 is a turbofan engine, although the present disclosure may likewise be used with other engine types. The engine 100 includes a compressor section 102 having a compressor 104 in a primary gas path 106 to supply compressed air to a combustor 108 of the aircraft engine 100. The primary gas path 106 includes a nozzle manifold 110 for issuing fluid to the combustor 108.

The primary gas path 106 includes, in fluid communication in a series: the compressor 104 having an inlet 112, the combustor 108 fluidly connected to an outlet 114 of the compressor 104, and a turbine section 116 fluidly connected to an outlet 118 of the combustor 108. The turbine section 116 is operatively connected to the compressor 104 to drive the compressor 104.

The combustor 108 includes a plurality of fuel nozzles 120 each fluidly connected via a fuel feed conduit 122, which feeds the nozzle manifold 110, which feeds the plurality of fuel nozzles 120 of the combustor 108 with a gaseous fuel supply 124. The feed conduit 122 includes an inlet end 126 and an outlet end 128 to fluidly connect a fuel supply 124 to the combustor 108 through the plurality of fuel nozzles 120. In embodiments, the fuel supply 124 can be any suitable fuel, such as a gaseous pressure and/or temperature regulated fuel supply, which may be or include hydrogen gas.

Certain additional components may also be included in fluid communication between the combustor and the gaseous fuel supply in any suitable order or combination, such as a fuel shut off valve 130, a fuel pump 132, a liquid/gaseous fuel evaporator 134, a turbine air cooling heat exchanger 136, a gaseous fuel accumulator 138, a gaseous fuel metering unit 140, and/or a fuel manifold shut off valve 142.

Referring now to FIG. 2, in accordance with at least one aspect of this disclosure, there is provided an electrical assist system 200 for an aircraft gas turbine engine (e.g. engine 100). An engine core 144 extends through and operatively connects the compressor section 102 and the turbine section 116 so the turbine section 116 can drive the compressor section 102. In embodiments, the engine 100 is a dual-spool engine, and the engine core includes a high pressure core 144a operatively connecting a high pressure turbine 116a of the turbine section to drive a high pressure compressor 104a of the compressor section 102. A low pressure core 144b connects a low pressure turbine 116b of the turbine section 116 to drive a low pressure compressor 104b of the compressor section 102. It is contemplated the engine 100 can have any number of spools and engine cores for a given application, without departing from the scope of this disclosure. An electric machine 146 (e.g. an electric motor) is operatively connected to the engine core 144, for example to at least one of the high pressure core 144a, and/or the low pressure core 144b.

A fuel control mechanism 147 is disposed in the fuel feed conduit 122 to selectively control fuel flow from the fuel source 124 to the plurality of fuel nozzles 120. The fuel control mechanism 147 can be any suitable controllable fuel flow valve, or in certain embodiments, the fuel control mechanism 147 can be the fuel pump 132 itself where the control module 148 is operatively connected to control the fuel pump 132. The control module 148 is operatively connected the electric machine 146 and the fuel control mechanism 147 to control fuel flow to the plurality of fuel injectors 120 and to control the electric machine 146 based on feedback from a plurality of inputs using a feedback control loop.

For example, the fuel flow mechanism 147 can be controlled based on feedback from at least a power sensor 150 electrically connected to the electric machine 146 to sense voltage and current of power supplied to the electric machine 146 (e.g. via a generator) so that the control module 148 is operable to control fuel flow based on feedback from the power sensor 150. In certain embodiments, a speed sensor 152 is operatively connected to a rotatable component (e.g. a shaft or a rotor) of the electric machine 146 to sense the rotational speed of the electric machine 146 so that the control module 148 is operable to control fuel flow based on feedback from the speed sensor 152.

In certain embodiments, the electric machine 146 can have an individual electric machine controller, separate from the control module 148. In such embodiments, the fuel flow mechanism 147 can be controlled based on feedback from a torque estimate (derived from a torque sensor on the shaft of the electric machine) that is calculated by the electric machine controller and shared with the control module 148 through a data bus (e.g. a CANbus).

With continued reference to FIG. 2, in certain embodiments the electric machine 146 can be controlled based on feedback from at least one of a rotational speed sensor 154 that is operatively connected to the engine core 144 (e.g. either the high pressure core 144*a* or low pressure core 144*b* in a dual-spool engine, or the single core in a single spool engine), an ambient pressure sensor 156, and/or a compressor discharge pressure sensor 158. The sensors 154, 156, 158 can be operatively connected to the engine 100 and to the control module 148 so that the control module 148 is operable to control fuel flow based on feedback from the rotational speed sensor 154, the ambient pressure sensor 156, and/or the compressor discharge pressure sensor 158.

In certain embodiments, the control module 148 includes machine readable instructions operative to accelerate the engine core 144 based on the sensor inputs described above. For example, the control module 148 can be operative to perform a method of accelerating the engine core 144, including adding torque to the engine core 144 to accelerate rotation of the engine core 144 by controlling fuel flow to the fuel injectors 120 based on feedback from the electric machine 146, and simultaneously adding torque to the engine core 144 by powering the electric machine 146.

In embodiments, controlling fuel flow based on feedback from the electric machine 146 includes controlling fuel flow to achieve a target torque from the electric machine 146. As used herein a target torque can be any suitable torque for a given application, for example, a target value such as zero torque, or a target value that can be a positive value or a negative value. A slightly negative target torque can be a constant extract of a small amount of electrical power, and a slightly positive value can be a constant add of a small amount of electrical power. In certain embodiments, constant addition or extraction of power could be useful to tune engine performance for peak efficiency (e.g. transferring power between high spool and low spool), or in certain embodiments, the steady extraction of power could be used to recharge batteries gradually and/or provide electrical power to other power consuming electric devices.

In embodiments, the method includes maintaining an engine core acceleration below a predetermined limit for compressor acceleration for the compressor section 102, and/or maintaining an acceleration of the engine core 144 below a predetermined limit for a P3/P1 ratio (where P3 is compressor discharge pressure for the gas turbine engine and P1 is ambient pressure for the gas turbine engine as sensed by sensors 156 and 158 respectively). In embodiments, controlling fuel flow can include controlling the fuel flow mechanism 147 to allow fuel flow to continue to be added to the plurality of fuel nozzles 120 until the electric machine 146 reaches a torque target, whereby power to the electric machine 146 can be reduced or stopped all together.

In embodiments, powering the electric machine 146 includes controlling the electric machine 146 based on the engine core speed feedback from the engine core 144 to reach a target core speed. Once the increased target speed is reached, the electric motor torque will be positive until the fuel flow is increased so that the turbine takes more of the compressor load and reduces the load on the electric machine 146. At that time, power to the electric machine 146 can be reduced or stopped all together and fuel flow to the plurality of fuel injectors 120 can be maintained.

In embodiments, the electric motor can be used to accelerate the engine core without being limited by surge limits because the motor does not rely on over-fueling to accelerate. In certain instances, this can allow the compressor run line to be set closer to the surge limit where its performance is better. Knowing the condition of the electric motor thus allows the control module to know if fuel flow should increase or decrease to off-load the electric motor. However, in embodiments, it is possible that the control module does not need to change fuel flow rapidly, though rapid fuel flow change may occur because the electric motor acceleration would have put the core into an under-fueled state temporarily. Accordingly, as long as electric motor torque is positive, the fuel flow can be increased more rapidly than may otherwise be the case. The rate of change in fuel flow will therefore depend on how quickly the electric motor can accelerate the core and knowing the torque can indicate whether the fuel flow can be further increased without surge.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

For example, the following particular embodiments of the present technology are likewise contemplated, as described herein next by clauses.

Clause 1. A method of accelerating a gas turbine engine (100) of an aircraft (1), comprising:

adding torque to a core (144) of the gas turbine engine to accelerate rotation of the core by controlling fuel flow to a plurality of fuel injectors (120) of the gas turbine engine; and adding torque to the core by powering an electric machine (146) that is operatively connected to the core to drive the core, wherein the controlling fuel flow to the plurality of fuel injectors is based on feedback from the electric machine.

Clause 2. The method as recited in clause 1, wherein the controlling fuel flow based on feedback from the electric machine includes controlling fuel flow to achieve a target torque from the electric machine.

Clause 3. The method as recited in clause 1, wherein the controlling fuel flow to the plurality of fuel injectors includes maintaining engine core acceleration below a predetermined limit for compressor acceleration for a compressor section (102) of the gas turbine engine.

Clause 4. The method as recited in clause 1, wherein the controlling fuel flow to the plurality of fuel injectors includes maintaining an acceleration of the core below a predetermined limit for P3/P1 ratio, wherein P3 is compressor discharge pressure for the gas turbine engine, and wherein P1 is ambient pressure for the gas turbine engine.

Clause 5. The method as recited in clause 1, wherein the powering the electric machine includes controlling the electric machine based on a core speed feedback from the core to reach a target core speed.

Clause 6. A method of accelerating a gas turbine engine (100) of an aircraft (1), comprising:

adding torque to a core (144) of the gas turbine engine to accelerate rotation of the core by controlling fuel flow to a plurality of fuel injectors (120) of the gas turbine engine; and adding torque to the core by powering an electric machine (146) that is operatively connected to the core to drive the core, wherein the controlling fuel flow includes at least one of:

controlling fuel flow based on feedback from the electric machine and controlling fuel flow to achieve a target torque from the electric machine;

maintaining an engine core acceleration below a predetermined limit for a compressor section of the gas turbine engine; and/or maintaining the engine core acceleration below a predetermined limit for P3/P1 ratio, wherein P3 is compressor discharge pressure for the gas turbine engine, and wherein P1 is ambient pressure for the gas turbine engine, and wherein the powering the electric machine includes controlling the electric machine based on a core speed feedback from the core to reach a target core speed.

Clause 7. An electrical assist system (200) for an aircraft (1), comprising:

a gas turbine engine (100) including:

a compressor section (102) having an inlet and an outlet;

a combustor (108) having an inlet and an outlet, wherein the inlet of the combustor is in fluid communication with the outlet of the compressor section;

a turbine section (116) having an inlet and an outlet, wherein the inlet of the turbine section is in fluid communication with the outlet of the combustor;

an engine core (144) extending through and operatively connecting the compressor section and the turbine section; and a plurality of fuel injectors (120) fluidly connected to issue fuel into the combustor for combustion;

an electric machine (146) operatively connected to the engine core; and a control module (148) operatively connected to control fuel flow to the plurality of fuel injectors and to control the electric machine based on feedback from at least one of: the compressor section, the engine core, the turbine section, and/or the combustor, wherein the control module includes machine readable instructions operative to perform acceleration of the engine core.

Clause 8. The system as recited in clause 7, wherein the machine readable instructions are further operative to:

add torque to the engine core to accelerate rotation of the engine core by controlling fuel flow to the plurality of fuel injectors of the gas turbine engine; and add torque to the engine core by powering the electric machine, wherein the controlling fuel flow is based on feedback from the electric machine.

Clause 9. The system as recited in clause 7, wherein the controlling fuel flow based on feedback from the electric machine includes controlling fuel flow to achieve a target torque from the electric machine.

Clause 10. The system as recited in clause 7, wherein the controlling fuel flow to the plurality of fuel injectors includes maintaining an engine core acceleration below a predetermined limit for compressor acceleration for the compressor section.

Clause 11. The system as recited in clause 7, wherein the controlling fuel flow to the plurality of fuel injectors includes maintaining an acceleration of the engine core below a predetermined limit for a P3/P1 ratio, wherein P3 is compressor discharge pressure for the gas turbine engine, and wherein P1 is ambient pressure for the gas turbine engine.

Clause 12. The system as recited in clause 7, wherein the engine core further includes:

a high pressure core (144a) operatively connecting a high pressure turbine (116a) of the turbine section to drive a high pressure compressor (104a) of the compressor section; and a low pressure core (144b) operatively connecting a low pressure turbine (116b) of the turbine section to drive a low pressure compressor (104b) of the compressor section, wherein the electric machine is operatively connected to at least one of the high pressure core and/or the low pressure core.

Clause 13. The system as recited in clause 12, wherein the electric machine includes a plurality of electric machines, wherein the plurality of electric machines are operatively connected to both the high pressure core and the low pressure core.

Clause 14. The system as recited in clause 12, further comprising a feedback control loop wherein torque feedback and rotational speed feedback from the electric machine are used to control fuel flow to the plurality of fuel injectors.

Clause 15. The system as recited in clause 14, wherein the feedback control loop includes a power sensor (150) electrically connected to the electric machine to sense voltage and current of power supplied to the electric machine, wherein the control module is operable to control fuel flow based on feedback from the power sensor.

Clause 16. The system as recited in clause 14, wherein the feedback control loop includes a speed sensor (152) operatively connected to a rotatable component of the electric machine to sense rotation speed of the electric machine, wherein the control module is operable to control fuel flow based on feedback from the speed sensor.

Clause 17. The system as recited in clause 14, wherein the feedback control loop further includes, at least one: of a rotational speed sensor (154) operatively connected to the engine core, an ambient pressure sensor (156), and/or a compressor discharge pressure sensor (158), wherein the control module is operable to control fuel flow based on feedback from the at least one of the rotational speed sensor, the ambient pressure sensor, and/or the compressor discharge pressure sensor.

Clause 18. The system as recited in clause 7, further comprising a fuel pump (132) fluidly connecting a fuel source (124) to the plurality of fuel injectors (120), wherein the control module is operatively connected to control the fuel pump to control fuel flow to the plurality of fuel injectors.

Clause 19. The system as recited in clause 18, wherein the controlling fuel flow includes adding fuel flow until the electric machine reaches a torque target.

What is claimed is:

1. A method of accelerating a gas turbine engine of an aircraft, the gas turbine engine having a high-pressure spool including a high-pressure turbine drivingly engaging a high-pressure compressor, and low-pressure spool including a low-pressure turbine drivingly engaging a low-pressure compressor, the gas turbine engine having a combustor, the high-pressure spool rotating independently of the low-pressure spool, the method comprising:

accelerating the high-pressure spool by both of causing an electric machine to add torque to the high-pressure spool and injecting a fuel flow into the combustor;

as the high-pressure spool is accelerating:

a) controlling an output torque of the electric machine as a function of a difference between a core rotational speed of the high-pressure spool and a target rotational speed of the high-pressure spool while maintaining a surge margin of the high-pressure compressor below a surge margin threshold;

b) determining the fuel flow to be supplied to the combustor using a feedback from the electric machine indicative of a difference between the output torque of the electric machine and a target output torque of the electric machine, and injecting the fuel flow to the combustor; and c) repeating steps a) and b) until the difference between the output torque of the electric machine and the target output torque of the electric machine is zero.

2. The method of claim 1, wherein the controlling of the output torque while maintaining the surge margin below the surge margin threshold includes:

maintaining a pressure ratio of a pressure at an outlet of the high-pressure compressor to an ambient pressure below a pressure ratio threshold.

3. The method of claim 2, includes:

receiving signals from an ambient pressure sensor and a compressor discharge sensor, the signals indicative of the ambient pressure and the pressure at the outlet of the high-pressure compressor.

4. The method of claim 1, wherein the repeating of the steps a) and b) includes repeating the steps a) and b) until the output torque of the electric machine is zero.

5. The method of claim 1, wherein the electric machine is powered by batteries, the method comprising:

setting the target torque of the electric machine to a negative value such that the high-pressure spool provides torque to the electric machine to recharge the batteries.

6. The method of claim 1, comprising:

determining that the core rotational speed reached the target rotational speed; and increasing the fuel flow to the combustor until the output torque of the electric machine reaches the target torque.

7. The method of claim 5, comprising:

once the output torque of the electrical machine reached the target torque, maintaining the fuel flow to a plurality of fuel injectors.

* * * * *